Dec. 13, 1966   J. P. SOHN ETAL   3,291,034
BEVERAGE DISPENSER

Filed Dec. 12, 1963   4 Sheets-Sheet 1

INVENTORS.
JOHN P. SOHN
BY ROBERT E. LITTLE

Trask, Jenkins & Hanley
ATTORNEYS.

Dec. 13, 1966   J. P. SOHN ET AL   3,291,034
BEVERAGE DISPENSER

Filed Dec. 12, 1963   4 Sheets-Sheet 3

INVENTORS.
JOHN P. SOHN
BY ROBERT E. LITTLE

ATTORNEYS.

INVENTORS.
JOHN P. SOHN
ROBERT E. LITTLE
BY
ATTORNEYS.

United States Patent Office 3,291,034
Patented Dec. 13, 1966

3,291,034
BEVERAGE DISPENSER
John P. Sohn and Robert E. Little, Columbus, Ind., assignors to Arvin Industries, Inc., Columbus, Ind., a corporation of Indiana
Filed Dec. 12, 1963, Ser. No. 330,162
13 Claims. (Cl. 99—291)

This invention relates to an apparatus for brewing and dispensing beverages such as coffee, tea, and the like.

It is an object of the invention to provide a beverage dispenser which will dispense beverages at a uniform temperature, which will permit the brewing of beverages to a controlled strength, and which will permit a plurality of different kinds of beverages to be brewed and dispensed. It is a further object of the invention to provide a beverage dispenser of attractive appearance, which will be of a compact size, and which can be economically manufactured largely from inexpensive plastic moldings.

In accordance with the invention, there is provided a ground-engaging base having a pedestal projecting upwardly therefrom upon which a housing is supported. Conveniently, the base is provided with means for supporting receptacles thereon to receive the dispensed beverages and for catching any overflow or drippings.

An enlarged opening is formed in the lower portion of the front housing wall for the reception of a removable filter tray. Said tray has a plurality of transversely aligned filter compartments adapted to hold the dry coffee, tea, or the like to be brewed. Preferably, the front tray wall is provided with reference indicia and is formed from a transparent material for measuring the quantity of materials in the several tray compartments.

A water tank is mounted in the housing above the tray and said housing is conveniently provided with a fill opening for adding water to the tank. A conduit is connected to the bottom of the tank and to a valve slidably carried in a transversely extending slot formed in the front housing wall intermediate the tray and the bottom of the tank. Said valve has an outlet within the extent of the housing and a control knob outside the extent of said housing whereby said outlet may be moved over the desired filter compartment for dispensing water into said compartment. The transparency of the front tray wall coupled with the indicia thereon permits measured quantities of the water to be introduced into the filter compartments. The filtered brew flows by gravity from the tray compartments through an opening in the housing into the receptacle on the base.

The water in the tank is heated by a thermostatically controlled heating element. Desirably, a float is also carried in the water tank in operative association with a proximity switch connected in the circuit to the heating element for thus opening the circuit to said heating element when the water in the tank reaches a predetermined level.

Other objects and features of the invention will become apparent from the more detailed description which follows and from the accompanying drawings, in which.

Figures 1, 4:
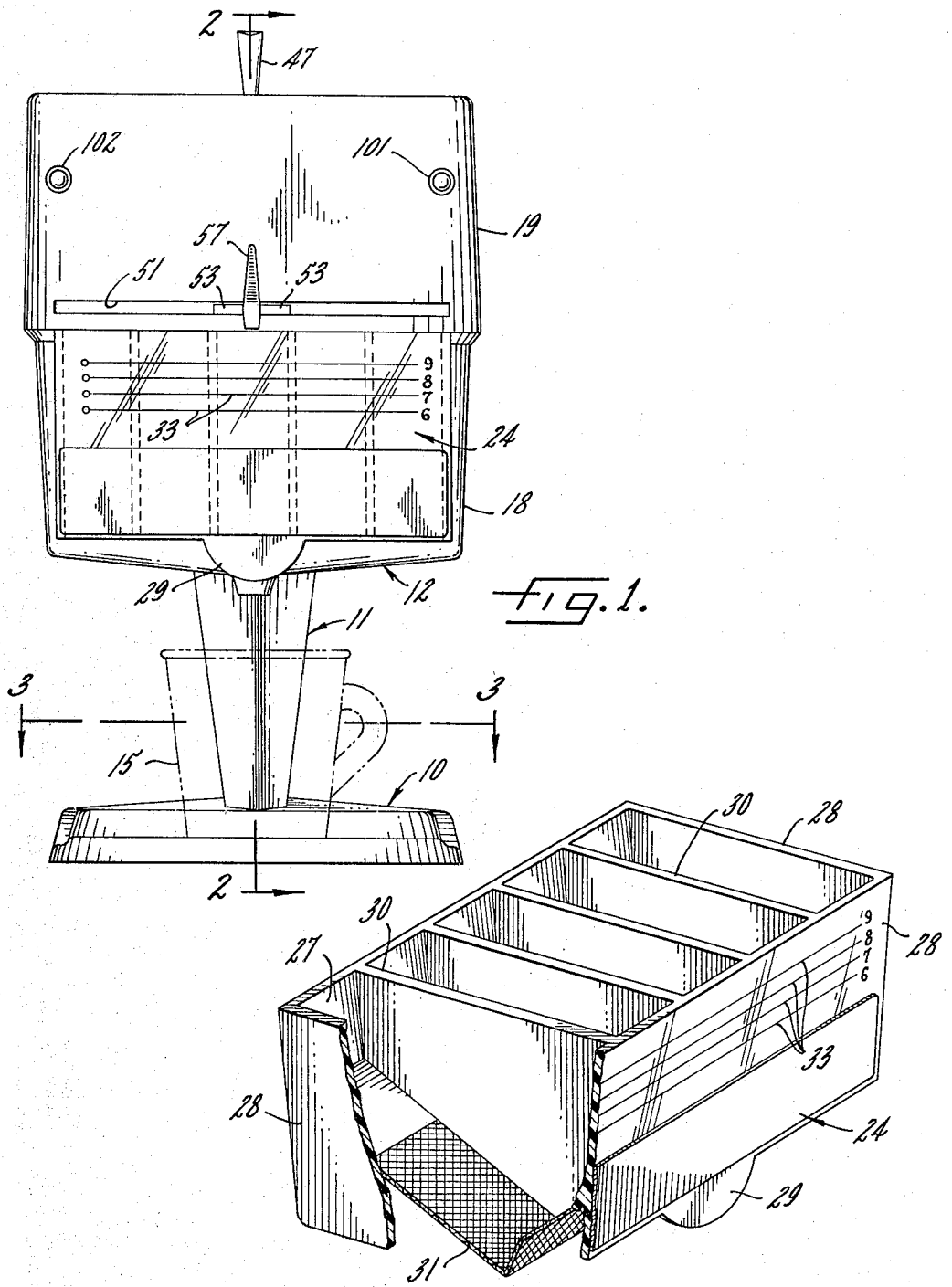
FIG. 1 is a front elevation of a beverage dispenser embodying the invention.
FIG. 4 is a perspective view of the filter tray shown in FIG. 2.

As shown, the invention comprises a ground-engaging base 10 having an upwardly projecting pedestal 11 mounted thereon adjacent the rear thereof. The pedestal is connected at its upper end to a housing 12 supported in an overhanging position above the base 10. Forwardly of the pedestal 11, the base 10 is provided with a recess 13 for the reception of an absorbent pad 14 upon which a beverage-receiving receptacle 15 may be supported. A plurality of grooves 16 radiating outwardly from the recess 13 terminate in a generally U-shaped reservoir 17 recessed in the base for catching and storing any overflow from the receptacle 15.

The housing 12 is conveniently formed from a pair of opposed plastic shells 18 and 19 interlockingly interconnected at their adjacent edges, as at 20. The lower shell 18, which is secured to the pedestal 11, has an enlarged opening 22 formed in its front face, and a pair of inwardly projecting ribs 23 are formed on the housing side walls in alignment with the lower edge of said opening.

The opening 22 is closed by a removable tray 24 comprising a front wall 26 and rear wall 27 interconnected by end walls 28 slidably supporting the tray on the ribs 23. Conveniently, a finger 29 projects downwardly from the lower edge of the front wall 26 to serve as a grip for facilitating the insertion and withdrawal of the tray in the housing. A plurality of transversely spaced walls 30 in parallelism with each other and with the end walls 28 extend between the front and rear walls 26 and 27 to divide the tray into a plurality of compartments. The bottom tray wall 31 is a meshed screen having a trough-shaped configuration so that each of the tray compartments constitutes an individual filter compartment. The screen forming the wall 31 has a mesh fine enough to retain dry coffee, tea, or the like within the compartments while permitting a liquid brew thereof to filter out the bottom of the tray. Desirably, the front tray wall 26 has a plurality of indicia 33 formed thereon, and said front wall is formed from a transparent material so that the quantities of the materials in the several filter compartments may be determined when the tray is in its operative position within the housing. The floor of the shell 18 tapers toward a laterally centered opening 35 disposed in vertical alignment with the recess 13 and the base 10 and forming a flow passage for the filtered brew from the shell 18 to the receptacle 15.

The water for producing the filtered brew is carried within a tank 38 mounted in the upper housing shell 19. Conveniently, said housing has a plurality of downwardly projecting bosses 40 in which screws 42 extending through flanges 44 on the tank 38 are received for mounting said tank within said housing above the tray 24. An opening 46 closed by a cap 47 is formed in the top of the shell 18 for adding water to the tank 38. The bottom of the tank 38 has an outlet connected through a nipple 48 to one end of an elongated flexible conduit 49. The opposite end of said conduit is connected to a valve 50 slidably carried in a transversely extending slot 51 formed in the front housing wall intermediate the tank 38 and tray 24.

Figure 2:
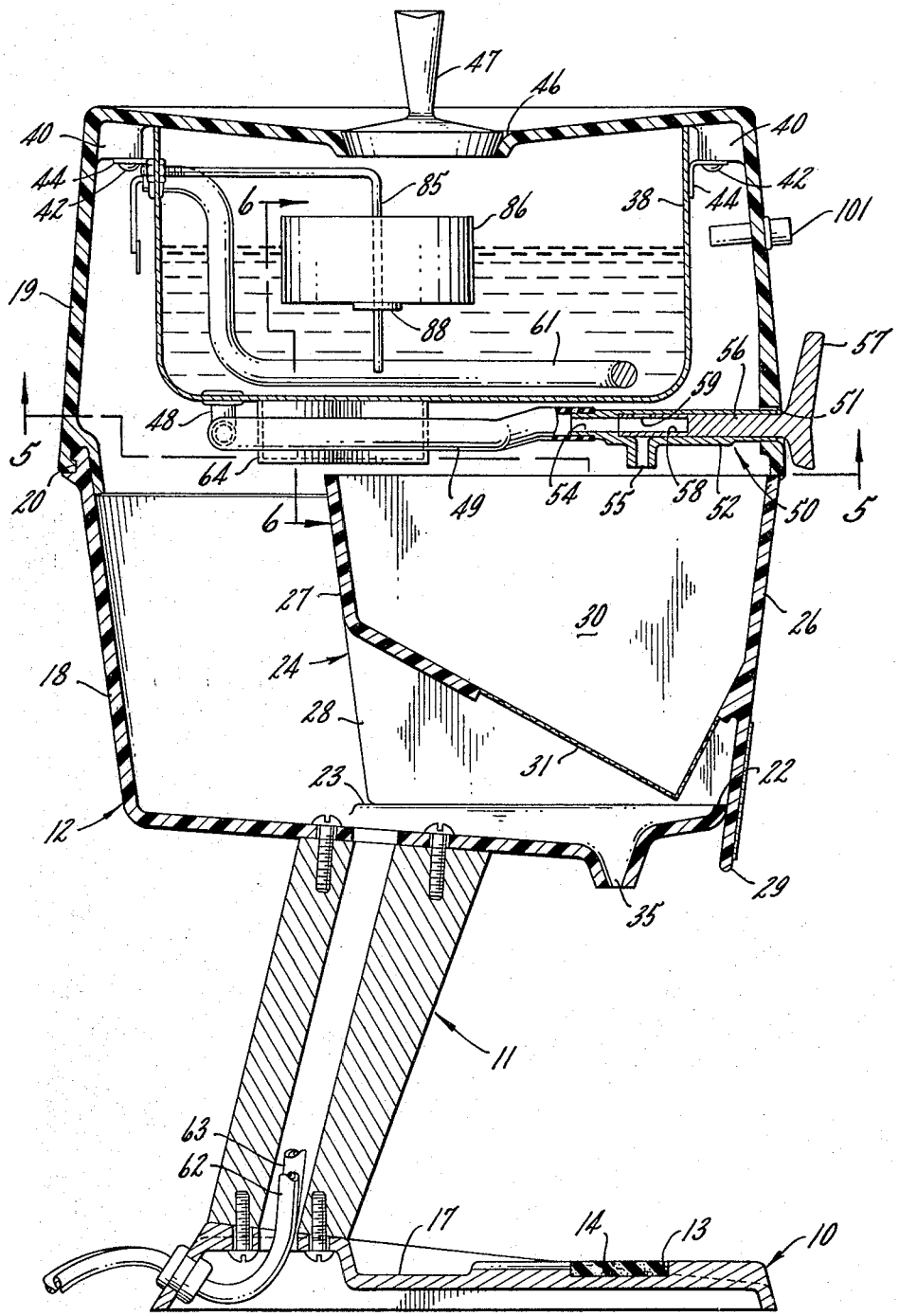
FIG. 2 is a vertical section taken on the line 2—2 of FIG. 1.
Figure 3:
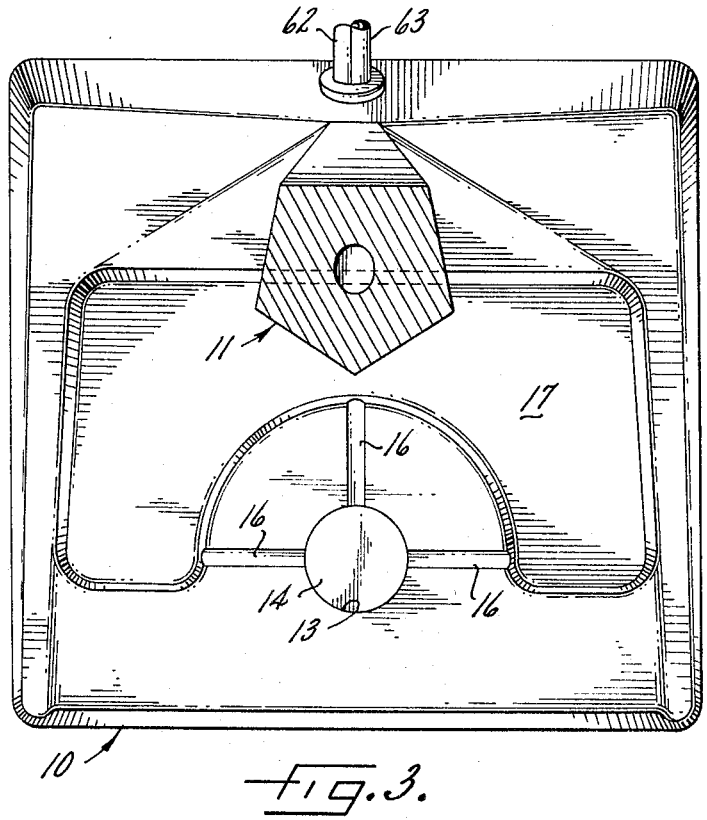
FIG. 3 is a horizontal section taken on the line 3—3 of FIG. 1, but with the receptacle removed therefrom.
Figure 7:
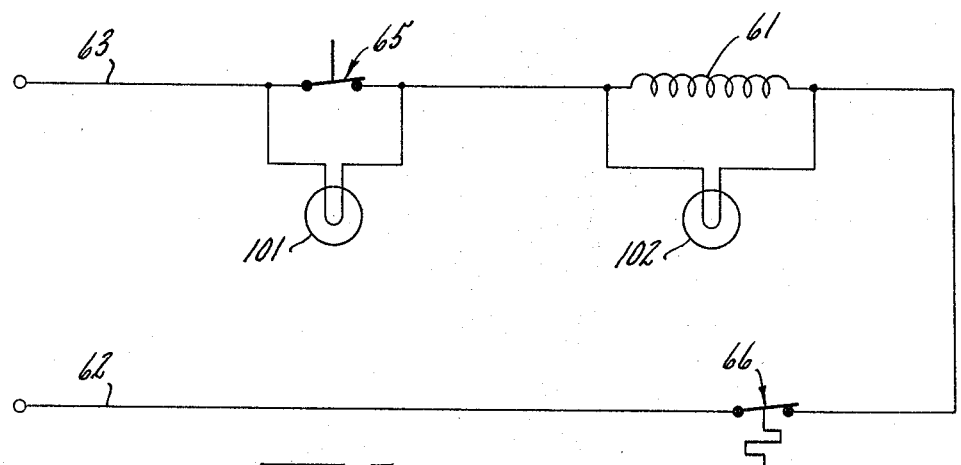
FIG. 7 is a schematic wiring diagram for the dispenser shown in FIG. 1.
Figure 5:
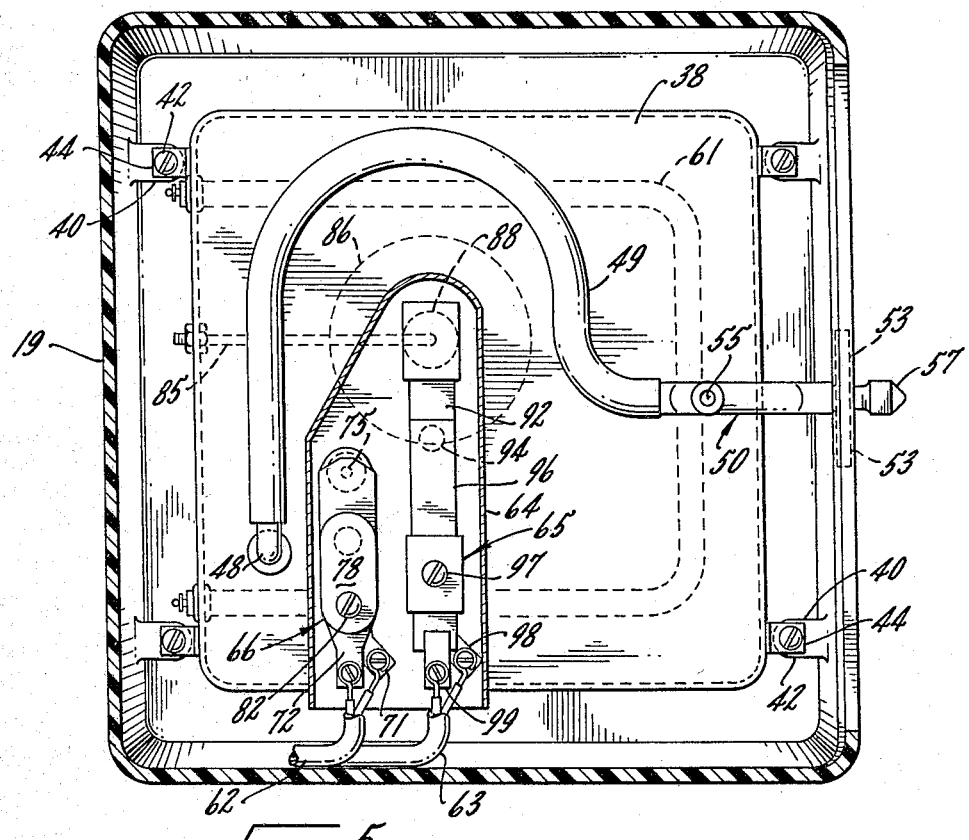
FIG. 5 is a horizontal section taken on the line 5—5 of FIG. 2.

As shown in FIG. 2, the valve 50 comprises a casing 52 connected to the conduit 49 and provided with a pair of laterally projecting arms 53 slidably engaging the upper and lower edges of the slot 51. A passage 54 extends through the casing 52 and is disposed in open communication with the conduit 49 and a downwardly open outlet 55. A valve stem 56 rotatably carried in the passage 54 is integrally connected to a control knob 57 disposed outside the extent of the housing 12. The inner end of the valve stem 56 has a passage 58 disposed in axial alignment with the passage 54 and in open communication with an orifice 59. The knob 57 serves as a handle for traversing the valve 50 across the dispenser housing to dispose the outlet 55 in vertical alignment with the desired compartment in the tray 24 and as a means for controlling flow through said valve.

In order to heat the water in the tank 38, a generally U-shaped heating element 61 is mounted within said tank and is connected to a pair of electrical leads 62 and 63 extending through the housing 12, pedestal 11, and base 10. The controls for the heating element 61 are carried within a casing 64 mounted on the bottom of the tank 38 adjacent a lateral edge thereof and include a proximity switch 65 and a thermostat switch 66.

Figure 6:
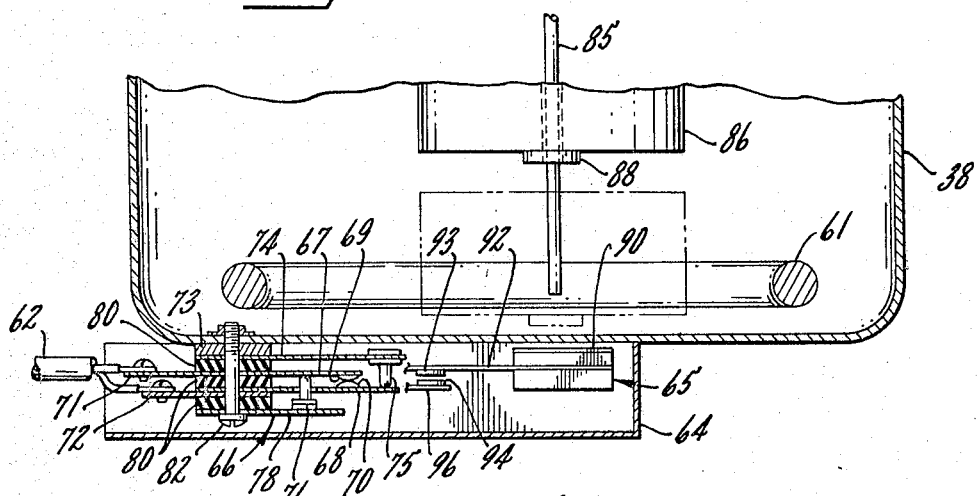
FIG. 6 is a vertical section taken on the line 6—6 of FIG. 2.

As shown in FIG. 6, the thermostat switch 66 comprises a pair of leaf arms 67 and 68 having contact points 69 and 70 and electrically connected to terminal plates 71 and 72 connected in the line 62. A heat-conductive washer 73 is carried in abutting heat-conductive relationship with the bottom of the tank 38 and a bimetal leaf 74 having an insulating stud 75 mounted thereon for engagement with the leaf arm 68 to permit said contacts to move toward each other as the temperature of the water drops. A predetermined spacing is maintained between the points 69 and 70 by an adjustable insulating stud 76 mounted on a rigid arm 78 and projecting through an opening in the arm 68 to engage the arm 67. A plurality of insulating layers 80 are interposed between the bimetal 74 and arm 67, plate 71 and arm 68, and plate 72 and arm 78, and the several components are retained in stacked position by a bolt 82 extending therethrough and connected to the tank 38. When the temperature of the water in the tank 38 reaches a predetermined level, the bimetal leaf 74 will cause the stud 75 to bear against the leaf arm 68 to open the contacts 69 and 70 to open the circuit to the heating element 61.

An L-shaped arm 85 is mounted on the tank 38 and extends through a float 86 riding on the surface of the water in the tank 38 for guiding the vertical movement of said float. A magnet 88 is mounted on the lower float face in vertical alignment with a metallic plate 90 carried on a leaf arm 92 of the proximity switch 65. Said arm also carries a contact point 93 engageable with a contact point 94 carried on a fixed leaf arm 96. The arms 92 and 96 are held in an insulated stack by a screw 97 connected to the tank 38 and are disposed in electrically conductive relationship with a pair of terminals 98 and 99 connected to the line 63. When the water in the tank 38 reaches a predetermined level, the float magnet 88 will attract the plate 90 to separate the contact points 93 and 94 to open the circuit to the element 61 so that said element will not remain energized when there is not a sufficient amount of water in the tank.

Conveniently, pilot lights 101 and 102 mounted in the housing 12 are wired in parallel with the proximity switch 65 and heating element 61, respectively to indicate when there is a sufficient amount of water in the dispenser and that that water is at the proper temperature.

Operation of the dispenser may be described as follows: The tray 24 is removed from the housing, and the desired material or materials, i.e. coffee, tea, or the like are placed in its filter compartments. The tank 38 is also filled with water through the fill opening 46; the thermostat switch 66 controlling the temperature of said water. With the tank and tray in such operative conditions, the valve 50 is traversed across the front of the housing in the slot 51 to dispose its outlet 55 in vertical alignment with the desired tray compartment. The control knob 57 is then rotated to bring the orifice 59 in alignment with the outlet 55 for a length of time sufficient to permit the desired amount of water to flow into said filter compartment. The indicia 33 will permit the water to be measured into the compartment for controlling the strength of the beverage to be dispensed. The meshed tray bottom 31 will cause the water to remain in the compartment for a short length of time to thus produce a brew which will filter through said bottom and then flow through the housing opening 35 into the receptacle 15. Any overflow or spillage of the receptacle will be retained in the reservoir 17.

The valve 50 is then moved into alignment with another tray compartment, and the dispenser is ready to brew and dispense another beverage. After all of the filter compartments have been used, it is merely necessary to remove the tray 24 and replace the grounds, leaves, etc. in the compartments with fresh coffee, tea, etc.

We claim:
1. A beverage dispenser, comprising a base having a pedestal projecting upwardly therefrom, a housing supported on said pedestal above the base, a water tank mounted in said housing, means for heating the water in said tank, a tray having a plurality of filter compartments removably mounted in said housing below said tank, and a valved delivery conduit connected to said tank and selectively movable over said filter compartments for dispensing the water from said tank into said compartments, said housing having an opening formed therein below said tray for passage of the filtered brew from said filter compartments into a receptacle, and said base having a first recess formed in its upper face in alignment with said housing opening, said first recess being interconnected to a second substantially larger recess by a plurality of grooves.

2. A beverage dispenser as set forth in claim 1 in which an absorbent pad is carried in said first recess.

3. A beverage dispenser, comprising a housing having an opening formed in the lower portion of one of its side walls, a pair of laterally spaced ribs extending inwardly from said opening, a tray insertable into said opening on said ribs and having front and rear walls interconnected by a pair of end walls and a plurality of transversely spaced intermediate walls parallel to said end walls whereby said intermediate walls define a plurality of filter compartments, a meshed lower wall extending along the bottom of said tray and closing the bottom thereof, a water tank mounted in said housing above said tray, and a valved delivery conduit connected to said tank and selectively movable over said filter compartments for dispensing the water from said tank into said compartments, said housing having a second opening formed therein below said tray for passage of the filtered brew from said filter compartments into a receptacle.

4. A beverage dispenser as set forth in claim 3 in which said lower wall has a generally trough-shaped configuration.

5. A beverage dispenser as set forth in claim 3 in which the front wall of said tray has a plurality of indicia thereon and is formed from transparent material whereby the quantity of material within said filter compartments is determinable when said tray is in operative position in said housing.

6. A beverage dispenser, comprising a housing having an opening formed in the lower portion of one of its side walls and a transversely extending slot above said opening, a tray having a plurality of filter compartments removably mounted in said opening, a water tank mounted in said housing above said tray, and a flexible conduit interconnected to said tank and to a valve slidably carried in said slot, said valve having an outlet disposed in vertical alignment with one of said filter compartments upon selective movement of said valve in said slot for dispensing the water from said tank into said one compartment upon opening of said valve, said housing having a second opening formed therein below said tray for passage of the filtered brew from said filter compartments into a receptacle.

7. A beverage dispenser as set forth in claim 6 in which said valve comprises a casing connected to said conduit and slidably carried in said slot, said casing having passage means interconnecting said conduit and outlet, and a valve stem adjustably mounted in said casing and projecting outside said housing, said valve stem being adjustable for controlling the flow of water between said outlet and conduit.

8. A beverage dispenser as set forth in claim 7 in which said casing has a pair of laterally projecting arms slidably carried against the upper and lower edges of said slot.

9. A beverage dispenser as set forth in claim 6 in which said valve comprises a casing connected to said conduit and slidably carried in said slot, said casing having an axially extending passage in open communication with said conduit and outlet, and a valve stem rotatably carried in said passage and connected to a control knob disposed outside the extent of said housing, said valve stem having an orifice in open communication with a passage in open communication with said casing passage whereby rotation of said valve stem will dispose said orifice in and out of alignment with said outlet for controlling the flow of water therefrom.

10. A beverage dispenser, comprising a housing, a water tank mounted in said housing, an electrical heating element mounted in said tank, a thermostat switch operatively connected to said tank for controlling the energization of said heating element, a float carried in said tank and having a magnet mounted thereon, a normally closed proximity switch mounted on said tank in operative association with said magnet whereby said magnet will cause said proximity switch to open when the water in said tank reaches a predetermined level, a tray having a plurality of filter compartments removably mounted in said housing below said tank, and a valved delivery conduit connected to said tank and selectively movable over said filter compartments for dispensing the water from said tank into said filter compartments, said housing having an opening formed therein below said tray for passage of the filtered brew from said filter compartments into a receptacle.

11. A beverage dispenser as set forth in claim 10 in which said thermostat and proximity switches are mounted on the bottom of said tank, said thermostat switch having a sensing element in thermo-conductive relationship with the tank bottom wall, and said magnet is mounted on the lower face of said float.

12. A beverage dispenser as set forth in claim 11 in which guide means are provided in said tank for retaining said float in alignment with the proximity switch.

13. A beverage dispenser, comprising a base having a pedestal projecting upwardly therefrom, a housing supported on said pedestal above the base and having an opening formed in the lower portion of one of its side faces, a tray having a plurality of transversely aligned filter compartments removably mounted in said opening, a water tank mounted in said housing above said tray, means for heating and controlling the temperature of the water in said tank, a conduit connected to said tank, and a valve connected to said conduit and slidably carried in a transversely extending slot formed in said one housing face intermediate said opening and the bottom of said tank for selectively dispensing the water in said tank into said filter compartments, said housing having a second opening formed therein below said tray for passage of the filtered brew from said filter compartments into a receptacle supported on said base.

References Cited by the Examiner
UNITED STATES PATENTS

| | | | |
|---|---|---|---|
| 79,723 | 7/1868 | Beach | 222—559 |
| 2,484,054 | 10/1949 | Sharp | 99—291 X |
| 2,862,440 | 12/1958 | Oakes | 99—282 |
| 3,126,812 | 3/1964 | Nau | 99—290 X |

BILLY J. WILHITE, *Primary Examiner.*

WALTER A. SCHEEL, *Examiner.*

S. P. FISHER, *Assistant Examiner.*